United States Patent [19]

Kawai et al.

[11] Patent Number: 5,483,035
[45] Date of Patent: Jan. 9, 1996

[54] SYSTEM FOR AND METHOD OF CONTROLLING RESISTANCE WELDER

[75] Inventors: Shingo Kawai; Kenji Sahashi, both of Nagoya, Japan

[73] Assignee: Nadex Co., Ltd., Japan

[21] Appl. No.: 309,654

[22] Filed: Sep. 21, 1994

[30] Foreign Application Priority Data

Sep. 21, 1993 [JP] Japan .................. 5-234867
Feb. 24, 1994 [JP] Japan .................. 6-026636
May 11, 1994 [JP] Japan .................. 6-097654

[51] Int. Cl.$^6$ .................................. B23K 11/24
[52] U.S. Cl. ........................................ 219/110
[58] Field of Search ......................... 219/108, 109, 219/110

[56] References Cited

U.S. PATENT DOCUMENTS

| | | | |
|---|---|---|---|
| 4,028,522 | 6/1977 | Chihoske et al. | 219/109 |
| 4,329,561 | 5/1982 | Schafer et al. | 219/110 |
| 4,456,810 | 6/1984 | Schumacher et al. | |
| 4,678,887 | 7/1987 | Nagel et al. | 219/110 |
| 4,694,135 | 9/1987 | Nagel et al. | |

FOREIGN PATENT DOCUMENTS

62-18173  4/1987  Japan.

*Primary Examiner*—Clifford C. Shaw
*Attorney, Agent, or Firm*—Dennison, Meserole, Pollack & Scheiner

[57] ABSTRACT

A resistance welder controller is disclosed, which controls a resistance welder for welding workpieces clamped between two electrodes with Joule heat generated by passing a welding current between the electrodes. The controller includes a preliminary current passing device for passing preliminary current between the electrodes until the workpieces and the electrodes become intimate with one another, a regular current passing device for passing regular current between the electrodes for welding the workpieces, a current control device for controlling the welding current according to the rate of expansion of the workpieces or the rate of increase of the resistance of the workpieces, and a current passing ending device for ending the welding current at or after an instant when the rate of expansion of the workpieces or the rate of increase of the resistance of the workpieces has become substantially zero.

20 Claims, 8 Drawing Sheets

SYSTEM FOR AND METHOD OF CONTROLLING RESISTANCE WELDER

BACKGROUND OF THE INVENTION

1. Field of the Invention

This invention relates to a system for and a method of controlling a resistance welder for welding workpieces clamped between two electrodes with Joule heat generated by passing a welding current between the electrodes.

2. Description of the Prior Art

For obtaining satisfactory welding with a resistance welder, an adequate welding current has to be passed between two electrodes in dependence on workpieces. Japanese Patent Publication No. 62-18273 discloses a prior art system for automatically causing adequate welding current. In this system, a desired resistance curve representing the resistance between two electrodes that varies with time is set, and the welding current that flows between the electrodes is controlled such that the actual resistance between the electrodes conforms to the desired resistance curve.

The desired resistance curve varies depending on such welding conditions as the quality, thickness, quantity, etc. of the workpieces. That is, in the prior art system described above, the optimum resistance curve varies depending on the welding conditions such as the material of the workpieces. Therefore, it is necessary to set a desired resistance curve (reference resistance values) for each welding condition, which is considerably cumbersome.

Further, in order to perform adequate welding, the welding current has to be controlled according to the rate of expansion or resistance of workpieces as described later. Generally, the rate of expansion or resistance of workpieces is judged on the basis of the distance or the resistance between the electrodes. In the following case, however, the rate of expansion or resistance of the workpieces and the distance (or resistance) do not correspond to each other, so that adequate control cannot be obtained.

In case where the electrodes are not flat but have a projection or the like resulting from the breakage of their tip due to their use for a large number of times, in an initial stage of welding, such projection of the electrode sinks into the workpiece, so that the electrodes correspondingly approach each other. Consequently, even when the workpieces are inflated by heat generated by passing current, a certain portion of the expansion is canceled by the sunk portion of the electrode. Therefore, when the rate of expansion of the workpieces is judged from the distance between the electrodes, it is judged to be less than the actual rate of expansion. For this reason, if prior art control is directly adopted, it results in causing a greater welding current than is necessary, thus resulting in spattering.

A similar situation results where foreign particles are present between electrode and workpiece. In this case, as the foreign particles are burnt or dissolved by heat generated by current passing, the electrode is moved further toward the workpiece. Therefore, when the judgment is made from the distance between the electrodes, the work is judged to be shrunk correspondingly, and the rate of expansion of the workpieces is judged to be less than the actual rate of expansion.

In the above two cases, "the rate of expansion of the workpieces" may be replaced with "the resistance of the workpieces".

SUMMARY OF THE INVENTION

It is a first object of the present invention to provide a system for and a method of controlling a resistance welder which can automatically cause an adequate welding current between two electrodes without need of setting welding current for each of varying welding conditions such as the material, thickness, quantity, etc. of workpieces, and which can also weld the workpieces automatically and adequately irrespective of variations of the welding conditions.

It is a second object of the present invention to provide a system for and a method of controlling a resistance welder which permit judgment of the true rate of expansion (or resistance) of the workpieces from the distance (or resistance) between the electrodes and also permit control of welding current according to the true rate of expansion (or resistance) of the workpieces.

In order to attain the above first object, the present invention provides a system for controlling a resistance welder for welding workpieces clamped between two electrodes with Joule heat generated by passing a welding current between the electrodes, which comprises current control means for controlling the welding current according to the rate of expansion of the workpieces or the rate of increase of the resistance of the workpieces.

Further, according to the invention, there is provided a system for controlling a resistance welder for welding workpieces clamped between two electrodes with Joule heat generated by passing a welding current between the electrodes, which comprises current passing ending means for ending the welding current at or after an instant when the rate of expansion of the workpieces or the rate of increase of the resistance of the workpieces has become substantially zero.

Further, in order to attain the above second object, the present invention provides a system for controlling a resistance welder for welding workpieces clamped between two electrodes with Joule heat generated by passing a welding current between the electrodes, which comprises preliminary current passing means for passing preliminary current between the electrodes until the workpieces and electrodes become intimate with one another, and regular current passing means for passing regular current between the electrodes for welding the workpieces.

The term "the workpieces and the electrodes become intimate", means that the electrode end comes into entire and direct contact with the workpiece.

Further, according to the invention, there is provided a system in which whether the workpieces and the electrodes have become intimate with one another by the preliminary current passing judged from whether the distance between the electrodes has begun to increase with expansion of the workpieces.

Further, according to the invention, there is provided a system in which whether the workpieces and the electrodes have become intimate with one another by the preliminary current passing is judged from whether the resistance of the workpieces between the electrodes has turned to increase from reducing status.

Further, according to the invention, there is provided a system wherein the preliminary current passing means causes intermittent current passing.

The term "intermittent" means that there is a time of no current state between adjacent ones of a plurality of times of current passing (accurately between adjacent ones of a plurality of time zones during which substantial current passing is made). The "no current state" includes not only the case when the current is zero but also the case when there is a current which is considerably low compared to the current passed in the preliminary current passing.

Further, according to the invention, there is provided a system in which the current passed by the preliminary current passing means increases progressively with the lapse of time.

According to the invention, the current during a period of substantial current passing in the preliminary current passing (not including the no current state) increases progressively.

Further, according to the invention, there is provided a system which further comprises pause causing means for causing a pause of current passing between the preliminary current passing and the regular current passing.

The "pause of current passing" includes not only the zero current case but also the case when there is a current which is considerably low compared to the current value in the preliminary current passing.

Further, according to the invention, there is provided a system in which the pause of current passing caused by the pause causing means is ended at or after an instant when the rate of contraction of the workpieces or the rate of decrease of resistance of the workpieces has become substantially zero.

Further, according to the invention, there is provided a system wherein the initial current value in an initial stage of the regular current passing is determined with reference to the current value in the final stage of the preliminary current passing.

Further, according to the invention, there is provided a system in which the current value in the initial stage of the regular current passing is determined according to the time or rate of current passing in the preliminary current passing.

The "rate of current passing" means the integral of current for the current passing time.

Further, in order to attain both the first and second objects noted above, the present invention provides a system in which the current control means controls the regular current passing according to the current in the regular current passing according to the rate of separation of the electrodes from each other or the rate of increase of the resistance of the workpieces.

The "rate of separation of the electrodes" means the rate at which the distance between the two electrodes increases.

Further, according to the invention, there is provided a system in which the current passing ending means ends the regular current passing at or after an instant when the rate of separation of the electrodes from each other or the rate of increase of the resistance of the workpieces has become substantially zero.

Further, in order to attain the above first object, the present invention provides a method of controlling a resistance welder for welding workpieces clamped between two electrodes with Joule heat generated by passing a welding current between the electrodes, which comprises a current control step for controlling the welding current according to the rate of expansion of the workpieces or the rate of increase of the resistance of the workpieces.

Further, according to the invention, there is provided a method of controlling a resistance welder for welding workpieces clamped between two electrodes with Joule heat generated by passing a welding current between the electrodes, which comprises a current passing ending step for ending the passing of the welding current at or after an instant when the rate of expansion of the workpieces or the rate of increase of the current has become substantially zero.

In order to attain the above second object, the present invention provides a method of controlling a resistance welder for welding workpieces clamped between two electrodes with Joule heat generated by passing a welding current between the electrodes, which comprises a preliminary current passing step for passing preliminary current between the electrodes until the workpieces and the electrodes become intimate with one another, and a regular current passing step for passing regular current between the electrodes for welding the workpieces.

It is found that according to the invention adequate current can be passed between the two electrodes to obtain adequate welding irrespective of such welding conditions as the material, thickness, quantity, etc. of workpieces.

More specifically, it is found that there is a substantially fixed relation between the rate of expansion of workpieces and the welding current irrespective of the welding conditions such as the material, thickness, quantity, etc. of workpieces, and it is possible to obtain adequate welding through feedback control of the welding current according to the rate of expansion of the workpieces. Specifically, the current is increased if the rate of expansion is low and is reduced with a high expansion rate. This control is effective in an initial stage of welding.

Further, there is a substantially positive relation between the rate of expansion of workpieces and the resistance thereof, and thus a similar function is obtainable according to the rate of increase of the resistance of the workpieces.

Further, it is found that according to the invention, it is possible to obtain an adequate current passing ending timing to obtain adequate welding irrespective of such welding conditions as the material, thickness, quantity, etc. of workpieces.

Specifically, substantially zero rate of expansion of workpieces that the workpieces indicates have become sufficiently fused and will no further be fused, thus indicating that there will be no further volume expansion. With reference to this situation, the adequate current passing ending timing is obtained.

Further, since there is substantially a relation between the rate of expansion of workpieces and the resistance thereof as described before, a similar function is obtainable according to the rate of increase of the resistance of the workpieces.

Further, it is found that according to the invention, adequate welding is obtainable. It is thought that the reasons are as follows.

When an electrode end has a projection, in the preliminary current passing, the projection sinks into the workpiece as the workpieces are softened by the generated heat. Consequently, the electrode end becomes intimate with the workpiece. That is, the shape of a workpiece portion corresponding to the electrode becomes conforming to the electrode shape, so that a full area contact between the electrode end and the workpiece is obtained.

Further, when foreign matter is present between the electrode and the workpiece, the foreign matter is burnt or dissolved by heat generated in the preliminary current passing, and thus the electrode and the workpiece become intimate directly with each other. By carrying out the preliminary current passing until the electrode end and the workpiece become intimate with each other, the rate of expansion of the workpieces and the change in the distance between the electrodes are in accord with each other, and thus it is possible to grasp the rate of expansion of the workpieces accurately according to the change in the distance between the electrodes. It is thus possible to control the welding current in correspondence to the rate of expansion of the workpieces according to adequate welding, thus permitting adequate welding.

According to the invention by determining whether the workpieces and the electrodes have become intimate with one another by the preliminary current passing is determined based on the interelectrode distance it is possible to obtain effectively the function of the invention.

When the electrodes and the workpieces become intimate with one another, the rate of expansion of the workpieces and the distance between the electrodes become in accord with each other, and the distance between the electrodes turns to increase with the expansion of the workpieces caused by heat generated by the current passing.

Whether the electrodes and the workpieces have become intimate with one another is judged from whether the distance between the electrodes has turned to increase, and on the basis of this, a timing of ending the preliminary current passing can be obtained.

The function of the invention can be effectively obtained according to the invention by determining whether the workpieces and the electrodes have become intimate with one another by the preliminary current passing based on the interelectrode resistance.

It is found, that when the electrodes and the workpieces become intimate with one another, the resistance of the workpieces between the electrodes turns to increase from the decreasing status.

Before the electrodes and workpieces become intimate, the resistance between the electrodes is increased due to the Joule heat generated by current passing between the electrodes. Subsequently, as described above, with the sinking of the electrode into the workpiece or burning of foreign matter between the electrode and workpiece, the distance between the electrodes is reduced to reduce the resistance between the electrodes. When the electrodes and the workpieces become intimate, the distance between the electrodes turns to increase with the expansion of the workpieces. In addition, with increase of the temperature of the workpieces, the resistance thereof turns to be increased.

Thus, whether the electrodes and the workpieces have become intimate with one another is judged from whether the resistance of the workpieces between the electrodes has turned to increase from the decreasing status and, on the basis of this, a timing of ending the preliminary current passing can be obtained.

It is found that, according to the invention, by causing intermittent current passing it is possible to obtain more adequate welding.

The reason is thought to be as follows. Intermittent preliminary current passing means that there is a current passing pause period between adjacent stages of preliminary current passing (accurately between adjacent current passing periods in the preliminary current passing). Thus, after the electrode has sunk into the workpiece in the preceding preliminary current passing stage, in the current passing pause period the heat of the workpieces is dissipated, and thus the workpieces recover their hardness, thus preventing further sinking of the electrode. In the succeeding preliminary current passing stage, the electrode is caused to sink again to a predetermined extent. In this way, the electrode is caused to sink into the workpiece intermittently little by little, and it is avoided that the electrode sinks into the workpiece at a time and excessively (forming a hole in the workpiece in extreme cases). Instead, the electrode is caused to sink into the workpiece only to an extent necessary for the electrodes and the workpieces to become intimate with one another. That is, it is thought that it is guaranteed that the electrodes and the workpieces become adequately intimate with one another.

It is found that, according to the invention, by determining whether the preliminary current increases progressively over time more adequate welding is obtainable.

The reason is thought to be as follows. In an initial stage of the preliminary current passing, the electrode and the workpiece are in contact with each other over a small area. The area of contact is increased gradually to disperse the Joule heat as the electrodes and the workpieces become intimate gradually in the preliminary current passing. Consequently, the current in the preliminary current passing is increased gradually to make up for the dispersion of the Joule heat. Thus, the workpieces are thought to be held at an adequately high temperature state at all times.

It is found that, according to the invention, by causing a pause of the current passing between the preliminary current passing and the regular current passing more adequate welding is obtainable.

The reason is thought to be as follows. In the preliminary current passing, heat is gradually stored in the workpieces. However, a portion of the workpieces that has been heated from the initial stage of the preliminary current passing and a portion turning to be heated subsequently by being contacted by the electrode may be at different temperatures. When the workpieces are cooled once, this temperature non-uniformity is precluded. Thus, in the regular current passing the workpieces can be uniformly heated to high temperature to obtain adequate welding.

It is found that, according to the invention, by causing the pause of current to be ended at or after an instant when the rate of contraction of the workpieces or the rate of decrease of the resistance of the workpieces has become substantially zero more adequate welding is obtainable.

The reason is thought to be as follows. When a current passing pause is brought about after the preliminary current passing, the temperature of the workpieces is reduced Thus, after the peak of the thickness or the resistance of the workpieces has passed, the workpieces are reduced in thickness (i.e., shrunk), and thus, their resistance is reduced. With sufficient temperature reduction of the workpieces, the shrinkage and resistance reduction of the workpieces have settled (with the rate of shrinkage and the rate of resistance reduction becoming substantially zero).

Thus, subsequent to the instant when the rate of shrinkage and the rate of resistance reduction have become substantially zero, the temperature of the workpieces is sufficiently low. It is thus guaranteed that in the regular current passing the workpieces are heated uniformly to a high temperature.

It is found that according to the invention, by determining the initial current value inn the initial stage of the regular current passing with reference to the current value in the final stage of the preliminary current passing more adequate welding is obtainable.

The reason is thought to be as follows. As a result of the gradual current increase in the preliminary current passing, the current in the final stage has a magnitude suited for the electrodes and the workpieces to become intimate with one another. It is thus thought that the regular current passing is suitably started with a current value which is based on the current noted above.

It is found that, according to the invention, by determining the current value in the initial stage of the regular current passing according to the time or rate of current passing in the preliminary current passing more adequate welding is obtainable.

The reason is thought to be that the time and amount of current passed in the preliminary current passing until the electrodes and the workpieces become intimate with one another may be the reference of the current in the initial state of the regular current passing.

According to the invention, by controlling current in the regular current passing according to the rate of separation of the electrodes from each other or the rate of increase of the resistance of the workpiece the following functions are obtainable. Specifically, in the preliminary current passing, the electrode end and the workpiece become intimate, so that the rate of expansion (or resistance) of the workpieces and the distance (or resistance) between the electrodes become accord with each other.

In the regular current passing, through feedback control of the welding current with reference to the rate of distance increase (or rate of resistance increase) between the electrodes, it is possible to obtain adequate welding automatically irrespective of such welding conditions as the material, thickness, quantity, etc. of workpieces. The control is effective in an initial stage of the regular current passing.

According to the invention, by ending the regular current passing at or after an instant when the rate of separation of the electrodes from each other or the rate of increase of the resistance of the workpiece has become substantially zero the following functions are obtainable. Specifically, in the preliminary current passing, the electrode end and the workpiece become intimate with each other, so that the rate of expansion (or resistance) of the workpieces and the distance (or resistance) between the electrodes become accord with each other.

Thus, in the regular current passing on the basis of the instant when the rate of distance increase (or rate of resistance increase) between the electrodes, an adequate timing of ending the regular current passing can be obtained. In this way, adequate welding can be obtained.

The present invention will be more fully understood from the following detailed description and appended claims when taken with the accompanying drawings.

DETAILED DESCRIPTION OF THE PREFERRED EMBODIMENTS

First Embodiment

Now, a first embodiment of the invention will be described with reference to the drawings.

Figure 1:
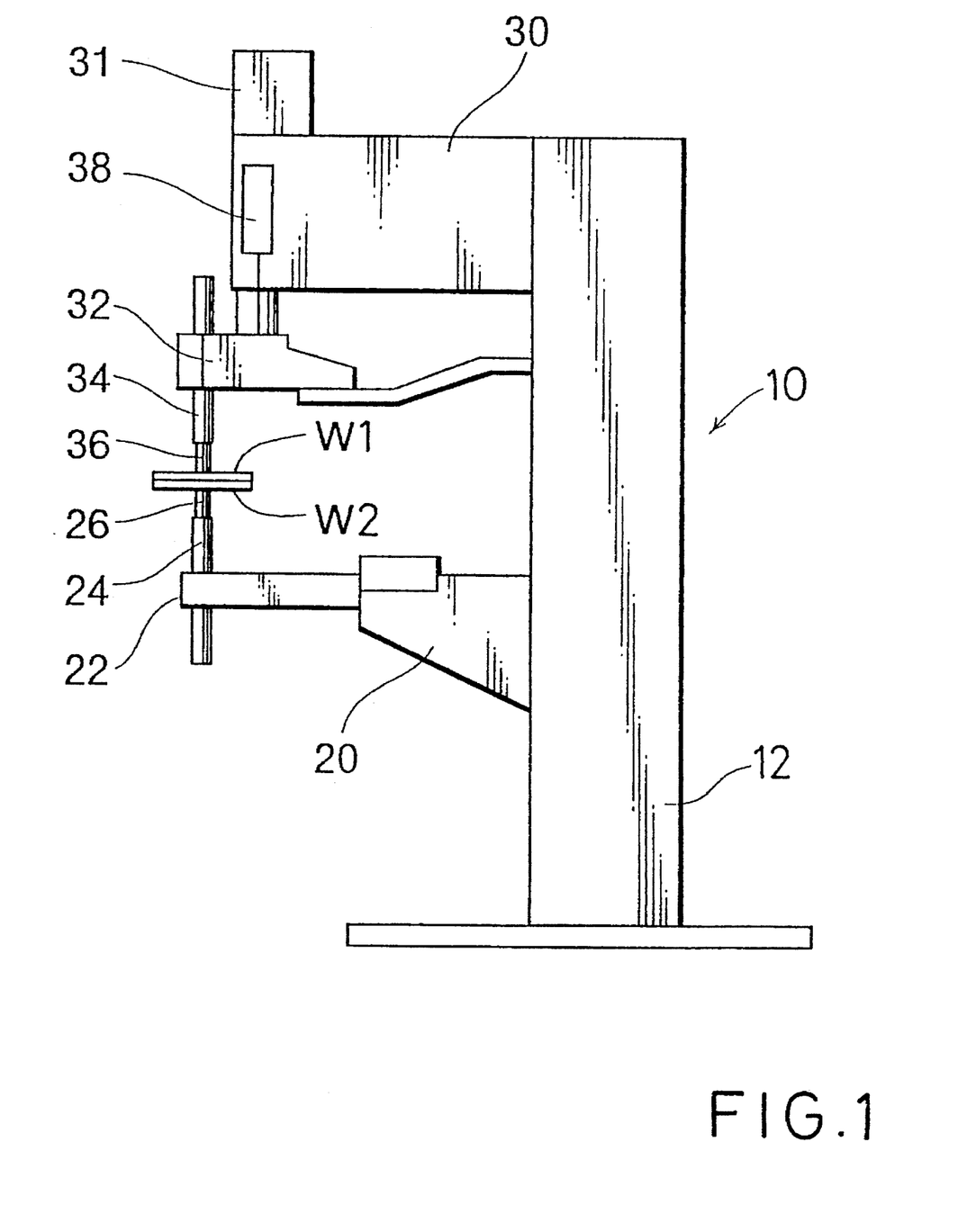
FIG. 1 is a side view showing a resistance welder as a subject of control In an embodiment of the invention.

Referring to FIG. 1, shown therein is a resistance welder 10 embodying the present invention. As shown therein, the resistance welder 10 comprises a body 12 from which a lower support 20 and an upper support 30 extend horizontally.

A lower platen 22 is secured to the lower support 20, and an upper platen 32 is provided in the upper support 30 such that it can be displaced vertically by a cylinder 31. The platens 22 and 32 have respective shanks 24 and 34 which in turn have respective electrodes 26 and 36. A displacement sensor 38 is provided on the upper support 30 to recognize the start and end positions (displacement) of the upper platen 32.

The upper platen 32 is lowered by driving the cylinder 31 to clamp workpieces W1 and W2 between the two electrodes 26 and 36. In this state, the workpieces W1 and W2 are welded by causing a welding current to be passed from a power circuit 42 (FIG. 2) between the electrodes 26 and 36.

Figure 2:
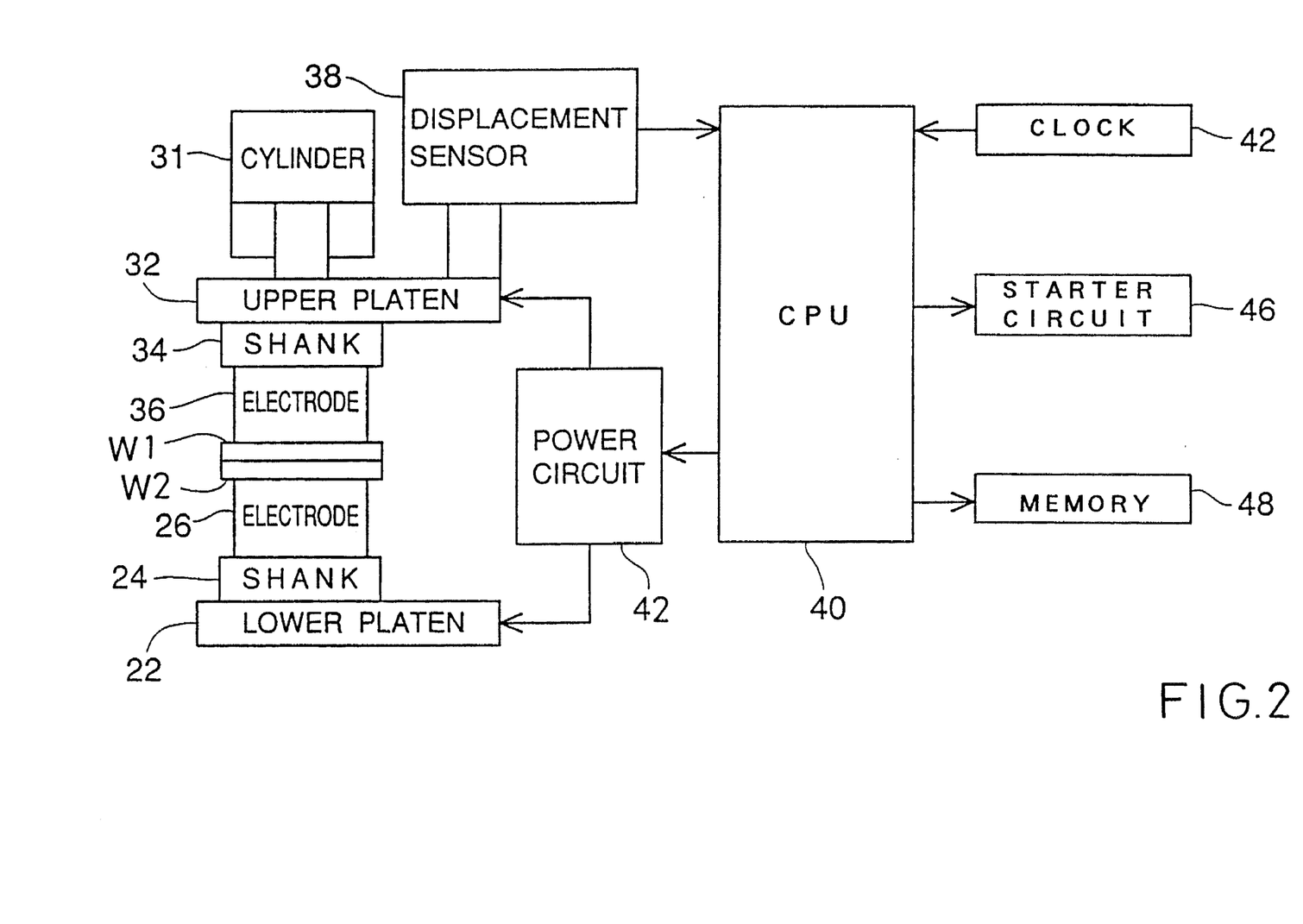
FIG. 2 is a block diagram showing the essential parts of the resistance welder shown in FIG. 1.

The body 12 includes a controller. The controller has a CPU 40. The power circuit 42 and the displacement sensor 38 are connected to the CPU 40. Further, a clock 44, a starter circuit 46 and a memory 48 are connected to the CPU 40. The starter circuit 46 controls the driving of the cylinder 31. In the memory 48, programs of control contents to be described later are stored.

Figure 3A:
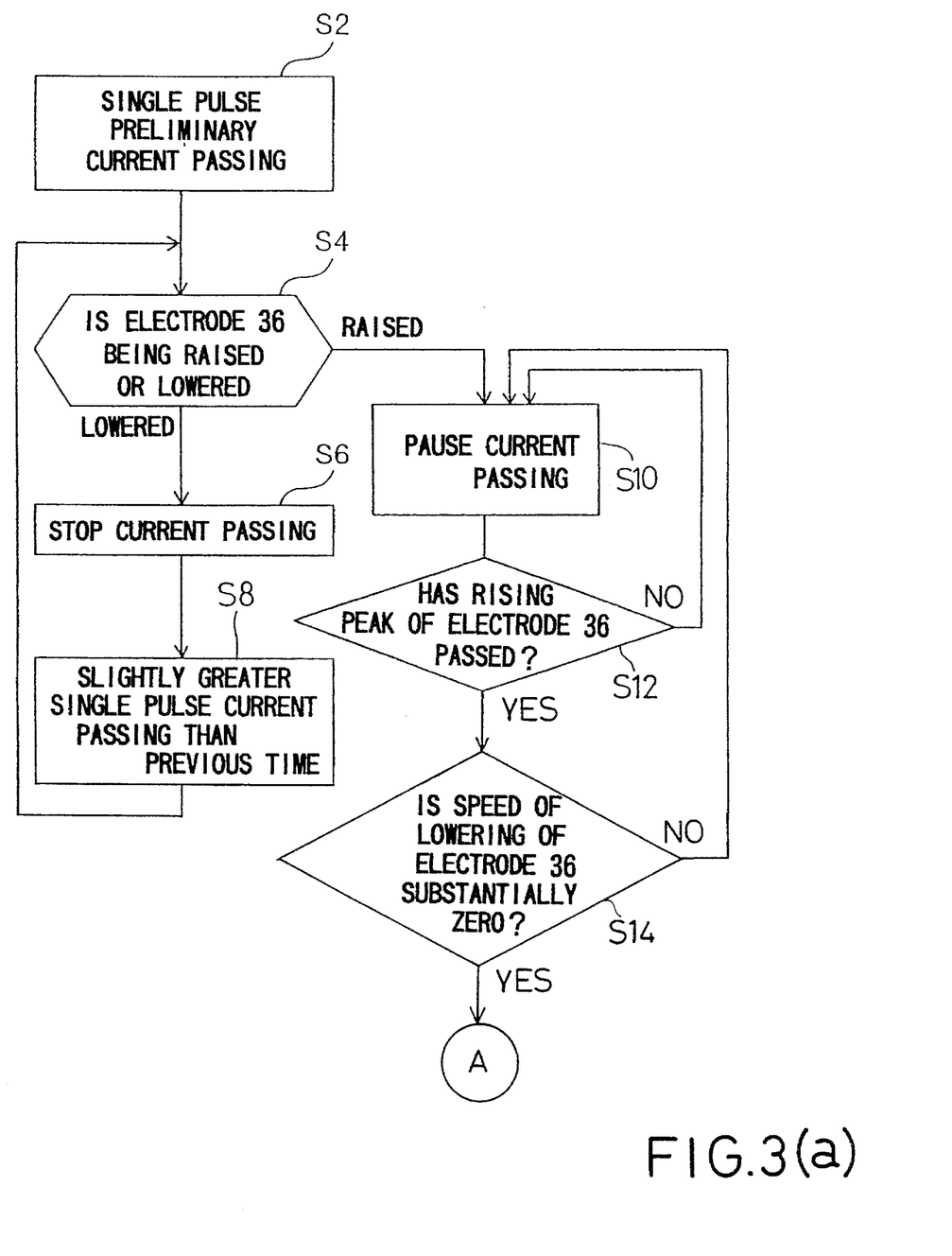
FIGS. 3(a) and 3(b) are a flow chart showing the contents of control in a first embodiment of the invention.
Figure 3B:
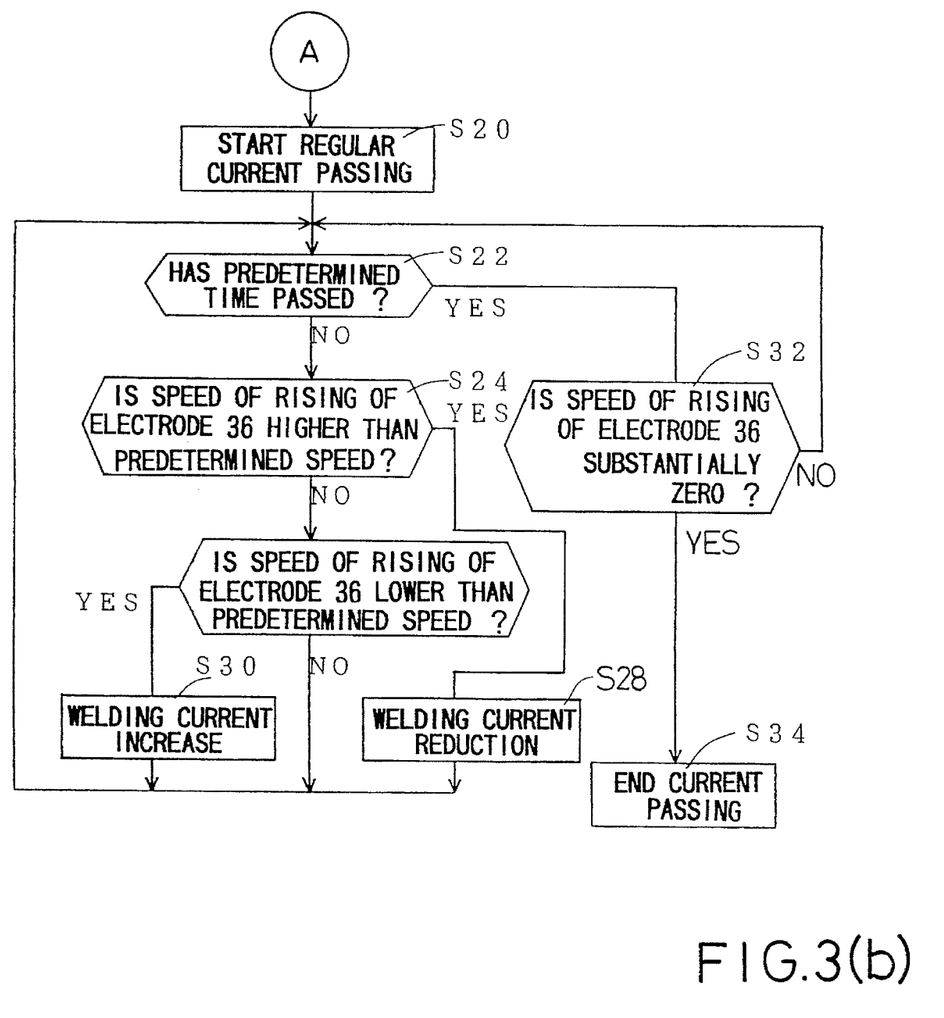
Figure 4:
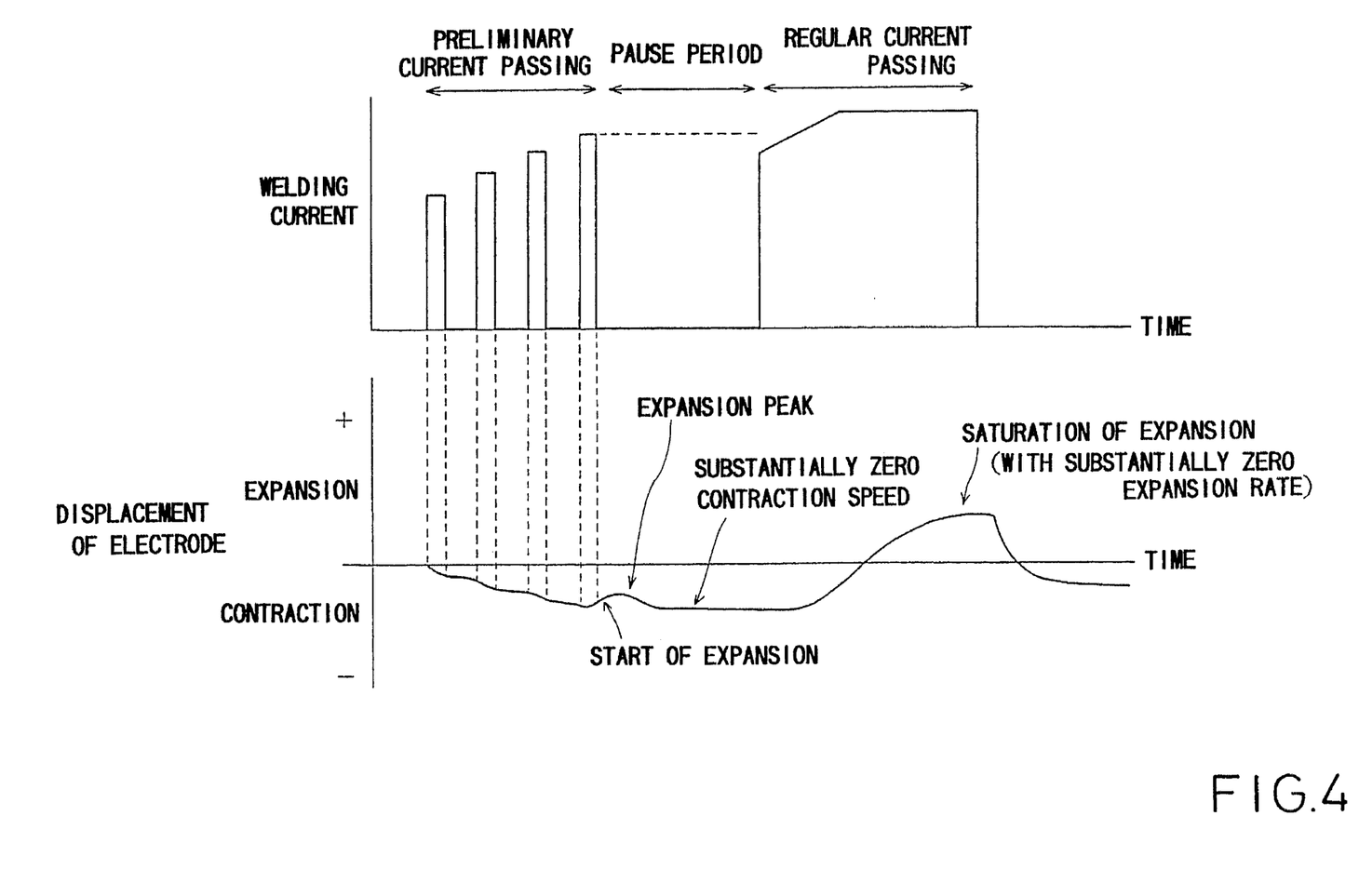
FIG. 4 is a timing chart corresponding to the flow chart shown in FIGS. 3(a) and 3(b)
Figure 5A:
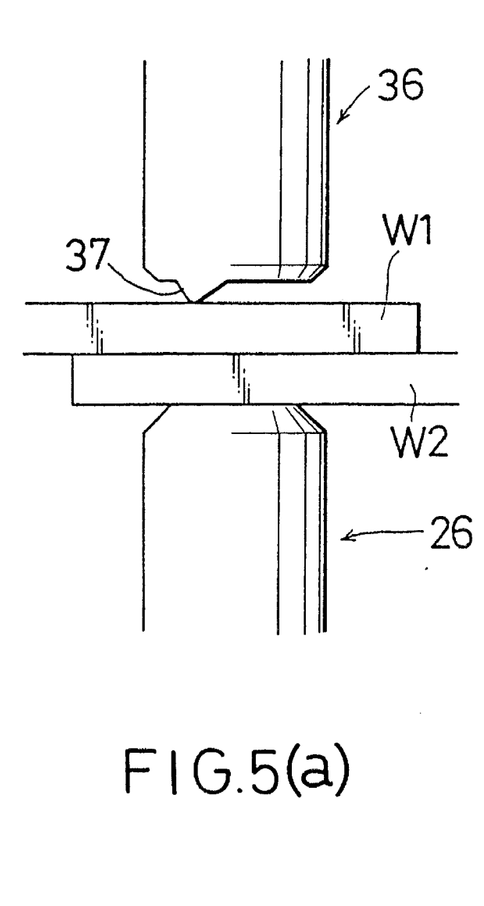
FIGS. 5(a) to 5(c) are views showing workpieces in estimated states in respective stages under control of the contents shown in FIGS. 3(a), 3(b) and 4.
Figure 5B:
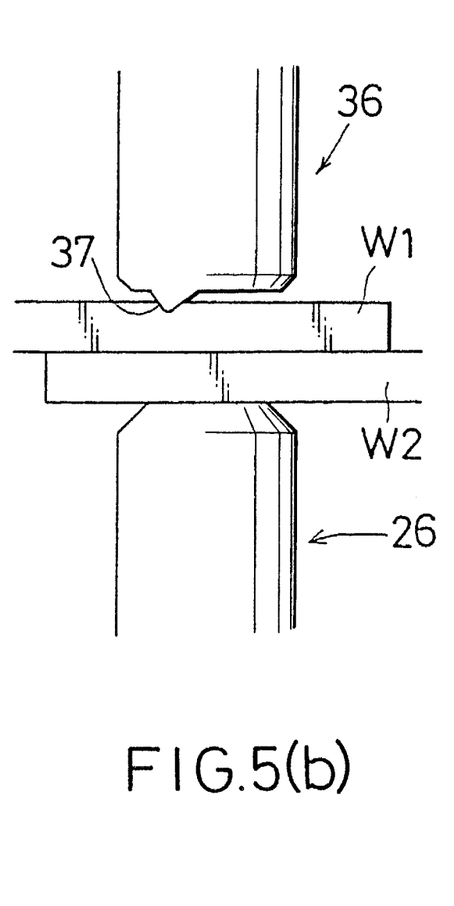
Figure 5C:
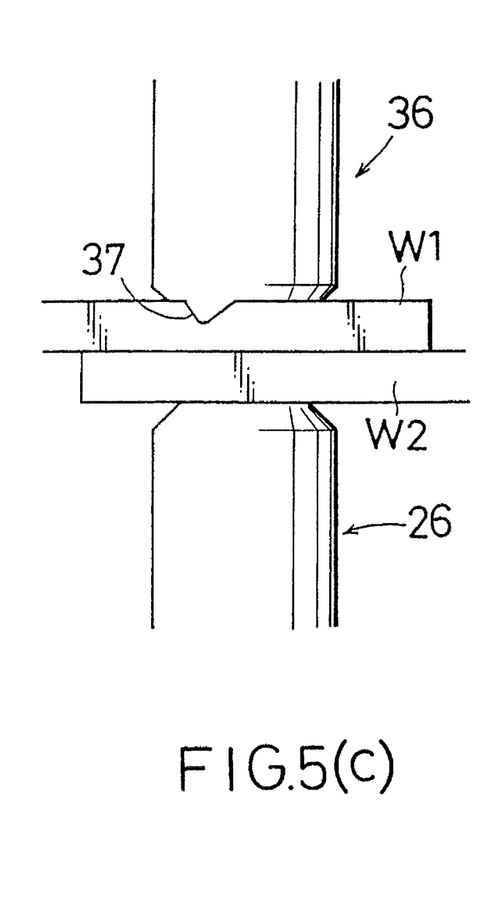

The control contents of the controller are as shown in the flow charts of FIGS. 3(a) and 3(b) and the timing chart of FIG. 4. FIGS. 5(a) to 5(c) show the states of the electrode 36 and the workpiece W1 under control. The clamp force between the electrodes 26 and 36 is held constant.

After the workpieces W1 and W2 have been clamped between the electrodes 26 and 36 as shown in FIG. 5(a), one pulse preliminary current passing is carried out in Step S2 in FIG. 3(a). The time of this current passing is set to about 10 milliseconds (and also the same in the following cases as well). As a result, a portion of the workpiece W1 that corresponds to a projection of the electrode 36 is elevated in temperature due to Joule heat.

In Step S4, the direction of the displacement of the electrode 36 is checked. If the electrode 36 is being lowered, the distance between the electrodes 26 and 36 is being reduced. If the electrode 36 is being raised, on the other hand, the distance between the electrodes 26 and 36 is being increased.

If it is found in Step S4 that the electrode 36 is being lowered (including the case of no vertical displacement), then, in Step S6, a current passing pause is brought about for a predetermined period of time (about 20 milliseconds, hereinafter being the same). When the electrode 36 is being lowered and sinking into the workpiece W1, it is thought that the following phenomenon is taking place.

As shown in FIG. 5(a), the end of the electrode 36 has a projection 37 or the like, and therefore, the contact between the end of the electrode 36 and the workpiece W1 (which has a flat surface) is not over the full surface area but over a small area of the tip of the projection 37 of the electrode 36. This means that the pressure applied to this portion per unit area is high, so that the extent to which the electrode 36 (i.e., the projection 37) sinks into the workpiece W1 which has been made soft by the heat generated by the current passing is surpassing the extent to which the workpiece W1 pushes up the electrode 36 due to the thermal expansion. Thus, as shown in FIG. 5(b), the electrode 36 slightly sinks into and thus becomes intimate with the workpiece W1. Consequently, the shape of the surface of the workpiece W1 becomes somewhat conforming to the shape of the end of the electrode 36 (i.e., the shape of the projection 7).

There may also be the following case. A foreign matter is present between the workpiece W1 and the electrode 36, and it is burnt or melted by the heat of current passing. In consequence, the extent to which the electrode 36 is lowered surpasses the extent to which the workpieces W1 and W2 push up the electrode 36 with the thermal expansion. With the sinking of the electrode 36 into the workpiece W1 to a certain extent, the electrode 36 and the workpiece W1 become intimate with each other. In other words, the foreign matter between the workpiece W1 and the electrode 36 is reduced in size, so that more direct contact between the workpiece W1 and the end of the electrode 36 is obtained.

With the current passing pause brought about in Step S4, heat is dissipated from the workpiece W1 to reduce the temperature of the corresponding portion of the workpiece W1 and recover hardness thereof. Thus, further sinking of the electrode 36 is substantially prevented.

Then, in Step S8, one pulse preliminary current passing is carried out with a current slightly higher than that in the previous time. The slightly higher current than that in the previous time is passed because it is empirically thought that doing so leads to more satisfactory results. The reason is thought to be as follows.

As a result of the previous preliminary current passing (in Step S2 or S8) and the pause (in Step S6), the end of the electrode 36 and the workpiece W1 have become intimate with each other, and in many cases, the area of contact between the end of the electrode 36 and the workpiece W1 has been increased compared to that in the previous stage. Thus, if a greater amount of Joule heat is generated by the greater current than in the previous time, the heat is dissipated over a greater area portion of the workpiece W1 (W2) than in the previous time. Thus, by passing greater current than in the previous time, an adequate high temperature state of the corresponding portion of the workpiece W1 is brought about as in the previous time.

The routine then goes back to Step S4 to repeat the loop of Steps S4 to S8. By repeating this loop, the end of the electrode 36 and the workpiece W1 become intimate more and more with each other. Specifically, when the end of the electrode 36 has the projection 37, the shape of the workpiece W1 is changed to the shape along the shape of the end of the electrode 36 as shown in FIGS. 5(a) to 5(c). When foreign matter is present between the electrode 36 and the workpiece W1, the foreign matter is gradually reduced in size, thus bringing about more and more direct contact of the electrode 36 with the workpiece W1.

Step S2 and the loop of Steps S4 to S8 correspond to preliminary current passing means (preliminary current passing step) for preliminary current passing.

If it is judged in Step S4 that the electrode 36 is being raised, Step S10 is executed to bring about a current passing pause for a predetermined period of time. When the electrode 36 is being raised, it is thought that the sinking of the electrode 36 is surpassed by the thermal expansion of the workpieces W1 and W2 so that the electrode 36 and the workpiece W1 are very intimate with each other. At and after this instant, a correspondence relation is thus obtained between the position of the electrode 36 (i.e., the distance between the electrodes 26 and 36) and the extent of expansion of the workpieces W1 and W2. It is thus possible to recognize the extent of expansion of the workpieces W1 and W2 by recognizing the position of the electrode 36. At this time, the preliminary current passing is no longer necessary. Thus, the preliminary current passing is ended, and the routine goes to the next step. That is, with the rising of the electrode 36 (i.e., increase of the distance between the electrodes 26 and 36), an adequate timing of ending the preliminary current passing can be obtained.

In Step S10, a current passing pause is brought about for a predetermined period of time, and in Steps S12 and S14, the displacement of the electrode 36 (i.e., expansion/shrinkage of the workpieces W1 and W2) is judged. With the current passing pause, the workpieces W1 and W2 are cooled down, and undergo shrinkage after their expansion peak has been passed. The expansion peak is thought to be a phenomenon of delay resulting from the previous current passing.

If the workpieces W1 and W2 are expanding (i.e., if the peak of rising of the electrode 36 is not exceeded), Step S12 provides "No", and the routine goes back to Step S10. The loop of Steps S10 and S12 is repeatedly executed until Step S12 provides "Yes".

After the provision of "Yes" in Step S12 (i.e., after the peak of rising of the electrode 36 has passed), a check is made in Step S14 as to whether the rate of shrinkage of the workpieces W1 and W2 (i.e., the rate of lowering of the electrode 36) has become substantially zero, that is, whether the shrinkage of the workpieces W1 and W2 has settled. If "No" is provided, the routine goes back to Step S10, and the loop of Steps S10, S12 and S14 is repeatedly executed until Step S14 provides "Yes".

In the above way, the current passing is paused until the rate of lowering of the electrode 36 becomes substantially zero, that is, until the shrinkage of the workpieces W1 and W2 is settled. This is so because it is thought that the workpieces W1 and W2 have been sufficiently cooled down when their shrinkage is settled.

The reason for that more satisfactory results are obtainable by the provision of such a pause time is thought to be as follows. While the loop of Steps S4 to S8 is executed repeatedly, heat is accumulated gradually although there is a pause time in Step S6. During this time, therefore, there occurs a portion of the workpieces W1 and W2 which has been in contact with and heated by the electrode 36 from the outset and a portion which has been subsequently contacted by the electrode 36 and turned to be heated from that instant. Therefore, the temperature of the workpieces W1 and W2 may not be uniform. With the current passing pause provided, the workpieces W1 and W2 are once cooled down, thus precluding the temperature non-uniformity state. Thus, in the regular current passing to be described later, the workpieces W1 and W2 can be uniformly elevated to a high temperature to obtain adequate welding.

Steps S10, S12 and S14 correspond to pause causing means.

The regular current passing is started from Step S20. The regular current passing, unlike the preliminary current passing, is not intermittent but is continuous. In this case, the current is gradually increased from the initial value. The initial current value in the regular current passing is set with reference to the current value of the last pulse of the preliminary current passing.

This is done so because the current value noted above is judged to be sufficiently large for necessary heat generation in that the push-up of the electrode 36 due to thermal expansion has been obtained by that preliminary current passing. In addition, it is not judged to be excessive because it is a result of gradual increase of the current in the preliminary current passing. (Passing an excessive current results in spattering and is therefore undesired.) However, for the sake of the reliability, the regular current passing is started with a current slightly smaller than the current value of the last pulse in the preliminary current passing.

In Step S22, a check is made as to whether a predetermined period of time has passed from the start of the regular current passing. This check is made because in the predetermined period of time from start of the regular current passing, the welding current is feedback controlled according to the extent of expansion of the workpieces W1 and W2, while such control is not made after the lapse of the predetermined time.

In the predetermined period of time from the start of the regular current passing, the welding current is controlled by feedback control according to the rate of expansion of the workpieces W1 and W2 in Steps S24, S26, S28 and S30.

More specifically, checks are made in Steps S24 and S26 as to whether the rate of rising of the electrode 36 is zero, higher or lower. At this time, since the extent of expansion of the workpieces W1 and W2 and the rate of rising of the electrode 36 have been made to be in accord with one another by the previous preliminary current passing, the extent of expansion of the workpieces W1 and W2 can be recognized by recognizing the rate of rising of the electrode 36.

If the rate of rising of the electrode 36 is lower than a predetermined value and also if the extent of expansion of the workpieces W1 and W2 is lower than a predetermined value (i.e., with "No" provided in Step S24 and "Yes" provided in Step S26), the welding current is increased in Step S30, and the routine then goes back to Step S22.

If the rate of rising of the electrode 36 is higher than the predetermined value and the extent of expansion of the workpieces W1 and W2 is higher than the predetermined value (i.e., with "Yes" provided in Step S24), the welding current is decreased in Step S28, and the routine goes back to Step S22.

If the rate of rising of the electrode 36 is the predetermined value and the extent of expansion of the workpieces W1 and W2 is the predetermined value (i.e., with "No" provided in both Steps S24 and S26), the routine goes back to Step S22 while holding the welding current value as such.

In this way, the current value is led to an adequate value. Steps S24 to S30 correspond to current control means (i.e., current control step).

After the predetermined period has passed from the start of the regular current passing, the rate of expansion of the workpieces W1 and W2 is gradually reduced even with an adequate current value. Thus, no feedback control of the welding current according to the rate of expansion of the workpieces W1 and W2 is made, and the routine goes to Step S32.

In Step S32, a check is made as to whether the rate of rising of the elect, rode 36 has become substantially zero. That is, a check is made as to whether the expansion of the workpieces W1 and W2 has saturated to make the rate of expansion of the workpieces W1 and W2 to be substantially zero. This is made so because it is empirically known that the welding of the workpieces has been completed when the expansion thereof is saturated. The loop of Steps S22 and S32 is executed repeatedly until the expansion of the workpieces W1 and W2 is saturated. During this time, welding current having a predetermined value is passed as described before.

When the expansion of the workpieces W1 and W2 is saturated, Step S32 provides "Yes", and in Step S34, the passing of the welding current, i.e., the regular current passing, is ended. This is done so because with substantially zero rate of expansion of the workpieces W1 and W2, it is estimated that the workpieces W1 and W2 have been sufficiently fused and will no further be fused to cause no further volume increase. In other words, with reference to this, an adequate timing of ending the regular current passing is obtainable.

Steps S32 and S34 correspond to current passing ending means (current passing ending step).

As has been shown, with the system and method as described above by the preliminary current passing carried out prior to the regular current passing the electrode 36 and the workpiece W1 are made to be intimate with each other, thus permitting determination of the extent of expansion of the workpieces W1 and W2 according to the position of the electrode 36 (i.e., the distance between the electrodes 26 and 36). Thus, it can be guaranteed that in the regular current passing an adequate welding current corresponding to the extent of expansion of the workpieces W1 and W2 can be passed according to the position of the electrode 36.

Second Embodiment

Now, a second embodiment of the invention will be described mainly about the difference from the first embodiment.

Figure 6A:
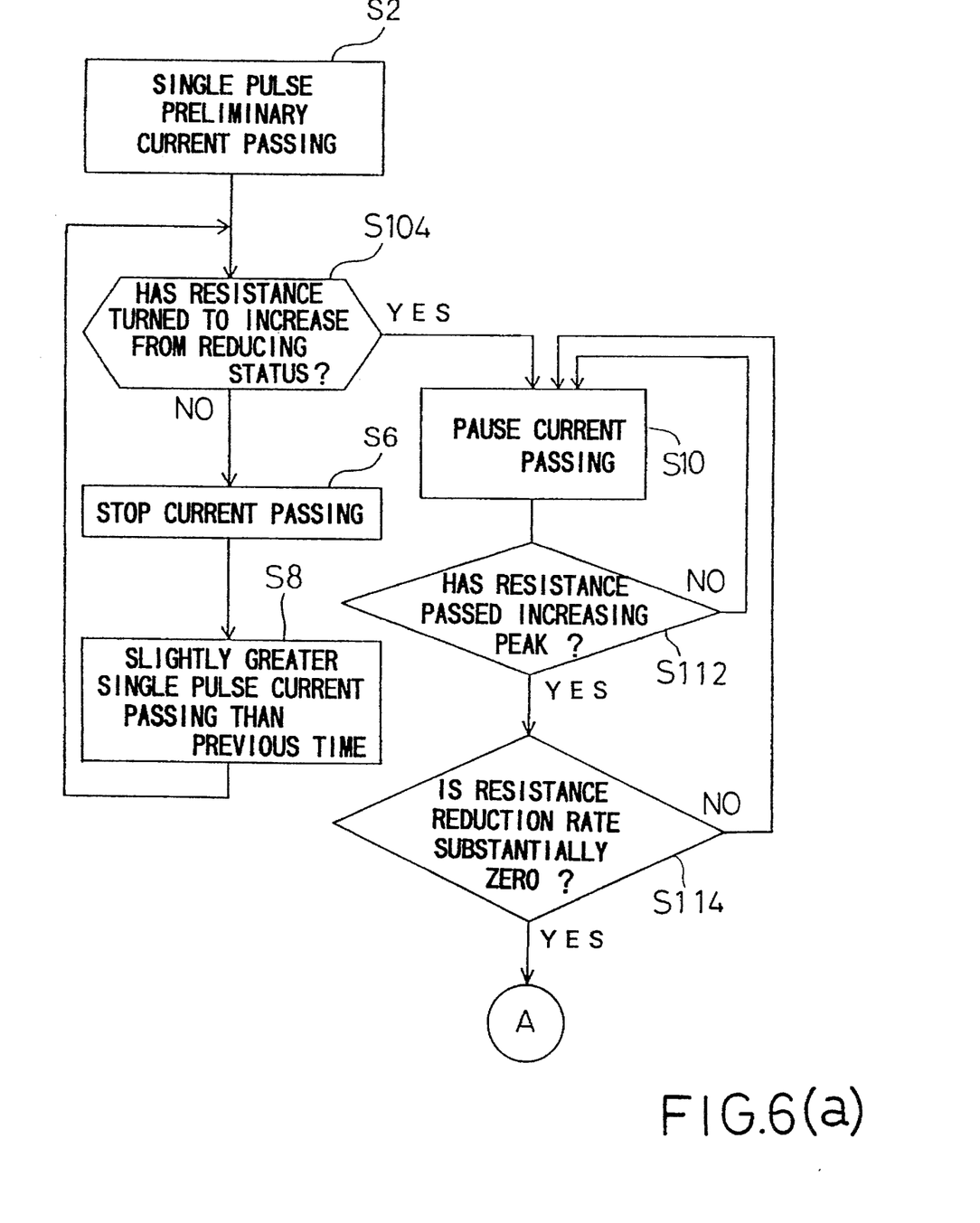
FIGS. 6(a) and 6(b) are a flow chart showing the contents of control in the second embodiment of the invention.

As shown in FIG. 6(a), the contents of control are different from those in the flow chart of FIG. 3(a) in that Steps S104, S112 and S114 are provided instead of Steps S4, S12 and S14.

In Step S104 subsequent to Step S2, a check is done as to whether the resistance between the two electrodes 26 and 36 has turned to increase from the increasing status. This is done so because the following was found empirically. Before the electrode 36 and the workpiece W1 become intimate with each other, the resistance between the electrodes 26 and 36 is once increased by Joule heat generated by the current passing between the electrodes 26 and 36. Subsequently, with sinking of the electrode 36 into the workpiece W1 or burning of foreign matter between the electrode 36 and the workpiece W1 as described above, the distance between the two electrodes 26 and 36 is reduced to reduce the resistance therebetween. When the electrode 36 and the workpiece W1 become intimate with each other, the distance between the electrodes 26 and 36 is increased with the expansion of the workpieces W1 and W2. As a result and also with temperature increase of the workpieces W1 and W2 the resistance thereof turns to be increased. The loop of Steps S2, S104, S6 and S8 is thus executed repeatedly until the resistance of the workpieces W1 and W2 between the electrodes 26 and 36 turns to increase from the decreasing status (i.e., until "Yes" is provided in Step S104).

In Steps S10, S112 and S114 which correspond to pause causing means, the following control is performed.

In Step S10, the current passing is paused for a predetermined period of time, and in Steps S112 and S114, the resistance between the electrodes 26 and 36 is judged. With the current passing pause brought about, the resistance of the workpieces W1 and W2 is reduced after passing its peak. In other words, it is thought that with the pause of the current passing through the workpieces W1 and W2, the workpieces W1 and W2 are cooled down and shrunk (i.e., reduced in thickness) as a result, thus reducing their resistance. The peak that is brought about is thought to be due to the phenomenon of delay by the previous current passing.

If the resistance peak has not yet been passed, Step S112 provides "No", and the routine goes back to Step S10. The loop of Steps Si0 and S112 is executed repeatedly until Step S112 provides "Yes". After the provision of "Yes" in Step S112 (i.e., after the resistance peak has been passed), a check is made in Step S114 as to whether the rate of the resistance reduction has become substantially zero (i.e., the resistance reduction has settled). If "No" is provided, the routine goes back to Step S10, and the loop of Steps S10, S112 and S114 is executed repeatedly until "Yes" is provided in Step S114. In this way, the current passing is paused until the resistance reduction is settled. This is done so because when the resistance reduction is settled, it is thought that the workpieces W1 and W2 have been cooled down sufficiently.

Figure 6B:
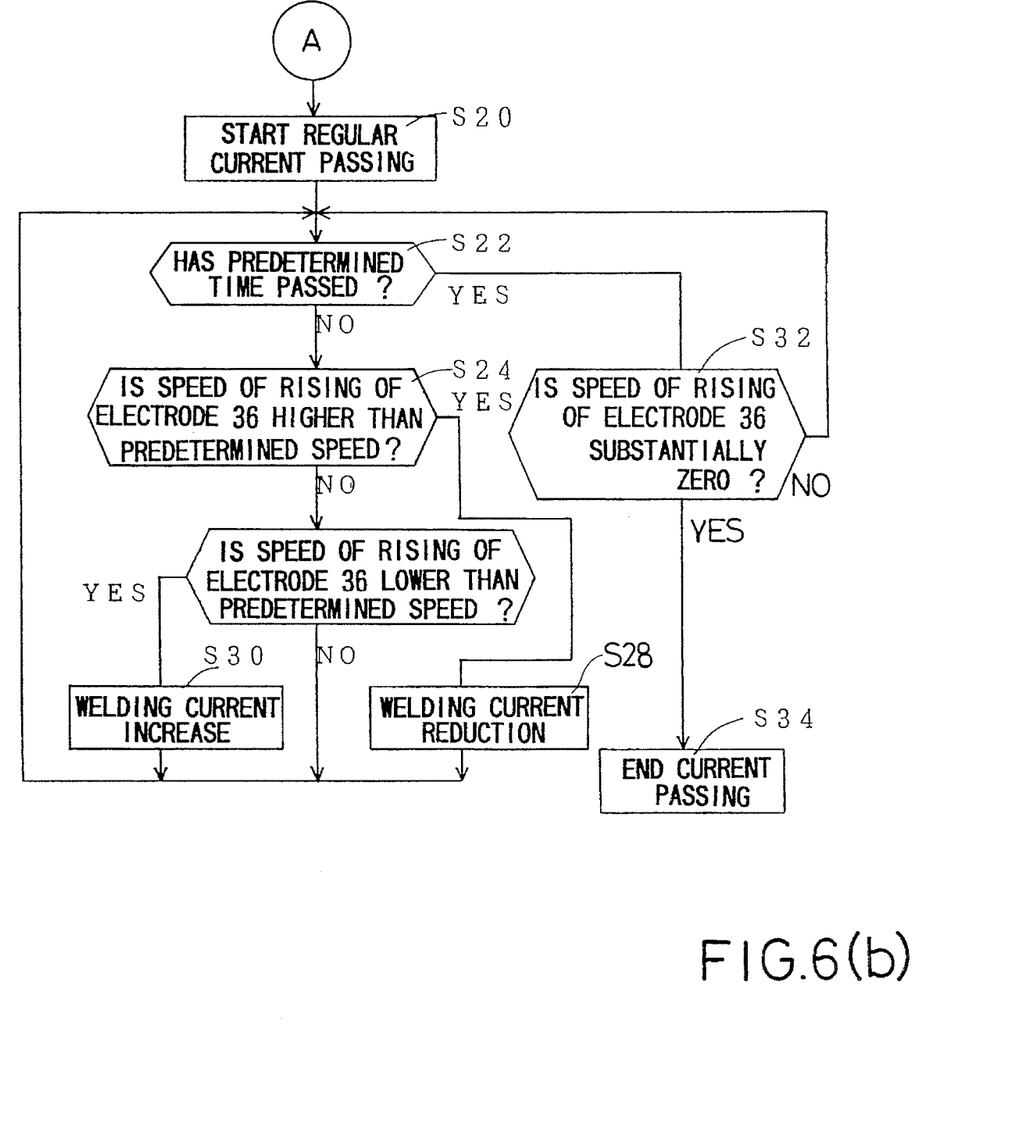

After the workpieces W1 and W2 have been sufficiently cooled down, the routine goes to Step S20 in FIG. 6(b) for the regular current passing as in the first embodiment.

The embodiments described above are by no means limitative, and various changes and modifications are conceivable.

For example, the preliminary current passing may not be intermittent but may be continued from the initial to the final stage. The current passed in the preliminary current passing may not be of a plurality of pulses as in the above first and second embodiments, but it may as well be a plurality of triangular waves or of a waveform of smoothly increasing and decreasing current. The current in the preliminary current passing may not be increased gradually. The no current passing pause period may be provided between the preliminary current passing and the regular current passing.

Further, unlike the above first and second embodiments, the current in the initial stage of the regular current passing may not be based on the current value in the final stage of the preliminary current passing but may be set on the basis of the time of or the amount of current passed in the preliminary current passing.

That is, the initial current value in the regular current passing may be set in correspondence to the time of the preliminary current passing such that it is large when the time of the preliminary current passing is long and it is small when the time of the preliminary current passing is short. Alternatively, it is possible to set the initial current value in the regular current passing such that it is large when the amount of current passed in the preliminary current passing large and it is small when the amount of current passed in the preliminary current passing is small.

As for the current value control and timing of ending of the regular current passing, because there is a positive relation between the rate of expansion of workpieces and the resistance thereof as described above, the following can be made.

It is possible to control the current value in the regular current passing not according to the rate of expansion of the workpieces (i.e., rate of distance increase between the electrodes) but according to the rate of resistance increase of the workpieces (i.e., rate of increase of the resistance between the electrodes). Further, the regular current passing may not be ended at or after the instant when the rate of expansion of the workpieces (i.e., the rate of increase of the distance between the electrodes) has become substantially zero. In other words, the "rate of rising of the electrode 36" in Steps S24, S26 or S32 in the flow chart of FIGS. 3(b) and 6(b) may be replaced with the "rate of increase of the resistance between the electrodes 26 and 36".

Further, when the electrodes and workpieces are intimate with one another from the outset, it is unnecessary to carry out any preliminary current passing, and the regular current passing may be carried out from the outset.

While the invention has been described with reference to preferred embodiments thereof, it is to be understood that modifications or variations may be easily made without departing from the scope of the present invention which is defined by the appended claims.

What is claimed is:

1. A system for controlling a resistance welder for welding workpieces clamped between two electrodes with Joule heat generated by passing a welding current between the electrodes, comprising:

preliminary current passing means for passing preliminary current between the electrodes until an interelectrode distance between the electrodes starts increasing;

regular current passing means for passing regular current between the electrodes after preliminary current passing has been ended; and current adjusting means for comparing the rate of increase of the interelectrode distance with a predetermined value, and for reducing the regular current if the rate of increase becomes higher than the predetermined value, and for increasing the regular current if the rate of increase becomes lower than the predetermined value, said current adjusting means being operable only immediately after the start of the regular current passing.

2. The system according to claim 1, wherein said preliminary current passing means causes intermittent current passing.

3. The system according to claim 1, wherein the current caused by said preliminary current passing means increases progressively with the lapse of time.

4. The system according to claim 3, wherein the initial current value in an initial stage of the regular current passing is determined with reference to the current value in the final stage of the preliminary current passing.

5. The system according to claim 3, wherein the current value in the initial stage of the regular current passing is determined according to the time of current passing in the preliminary current passing.

6. The system to according to claim 3, wherein the current value in the initial stage of the regular current passing is determined according to the total amount of current passing in the preliminary current passing.

7. The system according to claim 1, further comprising pause causing means for causing a pause of current passing between the preliminary current passing and the regular current passing.

8. The system according to claim 7, wherein the pause of current passing caused by said pause causing means continues until the rate of change of the interelectrode distance becomes substantially zero.

9. The system according to claim 1, wherein said regular current passing means ends the regular current passing at an instant when the rate of increase of the interelectrode distance has become substantially zero.

10. A method of controlling a resistance welder for welding workpieces clamped between two electrodes with Joule heat generated by passing a welding current between the electrodes, comprising the steps of:

passing preliminary current between the electrodes until an interelectrode distance between the electrodes starts increasing;

passing regular current between the electrodes after preliminary current passing has been ended;

comparing the rate of increase of the interelectrode distance with a predetermined value;

reducing the regular current if the rate of increase becomes higher than the predetermined value; and increasing the regular current if the rate of increase becomes lower than the predetermined value;

wherein said comparing step is executed only immediately after the start of the regular current passing.

11. A system for controlling a resistance welder for welding workpieces clamped between two electrodes with Joule heat generated by passing a welding current between the electrodes, comprising:

preliminary current passing means for passing preliminary current between the electrodes until an interelectrode resistance between the electrodes starts increasing;

regular current passing means for passing regular current between the electrodes after preliminary current passing has been ended; and current adjusting means for comparing the rate of increase of the interelectrode resistance with a predetermined value, and for reducing the regular current if the rate of increase becomes higher than the predetermined value, and for increasing the regular current if the rate of increase becomes lower than the predetermined value, said current adjusting means being operable only immediately after the start of the regular current passing.

12. The system according to claim 11, wherein said preliminary current passing means causes intermittent current passing.

13. The system according to claim 11, wherein the current caused by said preliminary current passing means increases progressively with the lapse of time.

14. The system according to claim 13, wherein the initial current value in an initial stage of the regular current passing is determined with reference to the current value in the final stage of the preliminary current passing.

15. The system according to claim 13, wherein the current value in the initial stage of the regular current passing is determined according to the time of current passing in the preliminary current passing.

16. The system to according to claim 13, wherein the current value in the initial stage of the regular current passing is determined according to the total amount of current passing in the preliminary current passing.

17. The system according to claim 11, further comprising pause causing means for causing a pause of current passing between the preliminary current passing and the regular current passing.

18. The system according to claim 17, wherein the pause of current passing caused by said pause causing means continues until the rate of change of the interelectrode resistance becomes substantially zero.

19. The system according to claim 11, wherein said regular current passing means ends the regular current passing at an instant when the rate of increase of the interelectrode distance has become substantially zero.

20. A method of controlling a resistance welder for welding workpieces clamped between two electrodes with Joule heat generated by passing a welding current between the electrodes, comprising the steps of:

passing preliminary current between the electrodes until an interelectrode resistance between the electrodes starts increasing;

passing regular current between the electrodes after preliminary current passing has been ended;

comparing the rate of increase of the interelectrode resistance with a predetermined value;

reducing the regular current if the rate of increase becomes higher than the predetermined value; and increasing the regular current if the rate of increase becomes lower than the predetermined value;

wherein said comparing step is executed only immediately after the start of the regular current passing.

* * * * *